United States Patent
Bi et al.

(10) Patent No.: US 6,751,042 B2
(45) Date of Patent: Jun. 15, 2004

(54) TRACK PITCH CORRECTION METHOD AND APPARATUS

(75) Inventors: Qiang Bi, Singapore (SG); Kevin Arthur Gomez, Singapore (SG); Jimmy TzeMing Pang, Singapore (SG); Gabor Szita, Newark, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 177 days.

(21) Appl. No.: 09/896,491

(22) Filed: Jun. 29, 2001

(65) Prior Publication Data

US 2002/0039247 A1 Apr. 4, 2002

Related U.S. Application Data

(60) Provisional application No. 60/227,621, filed on Aug. 23, 2000, and provisional application No. 60/254,939, filed on Dec. 12, 2000.

(51) Int. Cl.$^7$ .............................. G11B 5/596; G11B 21/02
(52) U.S. Cl. ..................... 360/77.02; 360/75; 360/77.08
(58) Field of Search ........................ 360/75, 77.02, 360/77.08, 77.04, 31, 69, 77.01, 77.11, 78.04

(56) References Cited

U.S. PATENT DOCUMENTS

| | | | |
|---|---|---|---|
| 4,939,599 A | 7/1990 | Chainer et al. | |
| 5,581,420 A | 12/1996 | Chainer et al. | |
| 5,793,554 A | 8/1998 | Chainer et al. | |
| 5,835,300 A | 11/1998 | Murphy et al. | |
| 5,844,742 A | 12/1998 | Yarmchuk et al. | |
| 5,875,064 A | 2/1999 | Chainer et al. | |
| 5,901,003 A | 5/1999 | Chainer et al. | |
| 6,005,751 A | 12/1999 | Kazmierczak et al. | |
| 6,411,461 B1 * | 6/2002 | Szita | 360/77.07 |
| 6,510,017 B1 * | 1/2003 | Abdelnour | 360/77.04 |

* cited by examiner

Primary Examiner—Andrew L. Sniezek
(74) Attorney, Agent, or Firm—Fellers, Snider, et al.

(57) ABSTRACT

Many parallel tracks on a storage surface of a data handling device are arranged in a longitudinal direction. Each track has a track center comprising reference points for fine lateral positioning. Each successive pair of track centers has a succession of lateral offset distance having an average. Because there are many successive pairs of tracks, there are many average lateral offset distances defining a statistical distribution having a variance.

The device includes a laterally movable transducer head and a longitudinally movable data surface. A signal is received from the transducer head while the data surface moves past the head. Many values each indicative of a lateral offset distance between a corresponding pair of lateral reference points are derived from the received signal. These offset-indicative values are used to shift at least some of the latitudinal reference points laterally so as to reduce this variance.

25 Claims, 10 Drawing Sheets

TRACK PITCH CORRECTION METHOD AND APPARATUS

RELATED APPLICATIONS

This application claims priority of U.S. provisional application Ser. No. 60/227,621 filed 23 Aug. 2000 and of U.S. provisional application Ser. No. 60/254,939 filed 12 Dec. 2000. This application is also related to co-pending, commonly-assigned U.S. utility patent applications as follows: Ser. No. 09/242,574 filed 3 Feb. 1999; Ser. No. 09/474,277 filed 29 Dec. 1999; Ser. No. 09/489,532 filed 21 Jan. 2000; Ser. No. 09/697,002 filed 26 Oct. 2000; Ser. No. 09/774,134 filed 30 Jan. 2001; and (practitioner docket STL9950 by Gabor Szita, filed on even date herewith).

FIELD OF THE INVENTION

This application relates generally to correcting a static track pitch distribution and more particularly to improving a data handling device by measuring and correcting track pitch.

BACKGROUND OF THE INVENTION

Disc drives are commonly used in workstations, personal computers, laptops and other data handling systems to store large amounts of data in a form that can be made selectively, readily available. In general, a disc drive comprises a magnetic disc that is rotated by a spindle motor. The surface of the disc is divided into a series of data tracks. The data tracks are spaced radially from one another across a band having an inner diameter and an outer diameter. Each of the data tracks extends generally circumferentially around the disc and can store data in the form of magnetic transitions within the radial extent of the track on the disc surface. Typically, each data track is include a number of data sectors that store fixed sized data blocks.

A head includes an interactive element, such as a magnetic transducer, that is used to sense the magnetic transitions to read data, or to transmit an electrical signal that causes a magnetic transition on the disc surface, to write data.

As known in the art, the magnetic transducer (or head) is mounted to a rotary actuator arm and is selectively positioned by the actuator arm over a preselected data track of the disc to either read data from or write data to the preselected data track, as the disc rotates below the transducer. The head structure includes a slider having an air bearing surface that causes the transducer to fly above the data tracks of the disc surface due to air currents caused by rotation of the disc.

An important aspect of conventional disc drive design concerns position control of the head. A position control system is used to accurately position a head over a data track during data read and write operations. Whenever data are either written to or read from a particular data track, the transducer gap of the head should be centered over the centerline of the magnetic transitions of the data track where the data are to be written or from where the data are to be read, to assure accurate transduction of the transitions representing data. If the head is off-center, the head may transduce (i.e. either read or write, as the case may be) transitions to or from an adjacent track, and thereby corrupt the data.

A closed loop servo system is typically used to control the position of the actuator arm. In a known servo system, servo position information is recorded on the disc surface itself, and periodically read by the head for use in controlling the position of the actuator arm. Such a servo arrangement is referred to as an embedded servo system. In modern disc drive architectures utilizing an embedded servo system, each data track is divided into a number of servo sectors generally equally spaced around the circumference of the data track. Each servo sector is further divided into a servo data field which contains information for positioning the head on the user track and a user data field where user information is read or written. Typically, user information is read and written to the data track in fixed size packets called data sectors. Data sectors may be written entirely within a single user data field on a user track or they may be written to the data track in a manner such that a servo sector splits the data sector between two data fields, as is well known.

Typically each servo sector is radially aligned with corresponding servo sectors of neighboring data tracks to form a set of radially extending, spoke-like servo sections that are equally spaced from one another around the circumference of the disc surface. The equal spacing between servo sectors provides a fixed frequency of servo occurrences regardless of the radial position of the head. However, when data are recorded in a zone bit arrangement, the number of data sectors within one rotation of a disc varies from zone-to-zone, thus causing the precise locations of servo sectors of the spoke-like sections, relative to the data fields of the data sectors, to vary from zone-to-zone and within a zone.

A zone bit arrangement is a known technique to maximize the storage capacity of a disc. In accordance with the fundamental geometry of a circle, the circumferences of the data tracks increase in a direction toward the outer diameter of the disc. Thus, each succeeding data track in the radially outward direction, has more potential data storage capacity than the preceding data tracks. A zone bit recording scheme takes advantage of the increasing circumference aspect of circle geometry. In a zone bit recording, the surface of the disc is divided into a set of zones. Each zone extends for a fixed radial length, and the magnetic transition frequency is increased from zone-to-zone, in the radially outward direction. Accordingly, the number of data sectors in each track increases, from zone-to-zone, in the radially outward direction.

In an embedded servo system, each servo field contains magnetic transitions, called servo bursts, that are arranged relative to a track centerline such that signals derived from the transitions can be used to determine bead position. For example, the servo information can comprise two separate bursts of magnetic transitions, one recorded on one side of the track centerline and the other recorded on the opposite side of the track centerline. Whenever a head is over a servo field, the head reads each of the servo bursts and the signals resulting from the transduction of the bursts are transmitted to, e.g., a microprocessor within the disc drive for processing.

When the head is properly positioned over a track centerline, the head will straddle the two bursts, and the strength of the combined signals transduced from the burst on one side of the track centerline will equal the strength of the combined signals transduced from the burst on the other side of the track centerline. The microprocessor can be used to subtract one burst value from the other each time a servo sector is read by the head. When the result is zero, the microprocessor will know that the two signals are equal, indicating that the head is properly positioned.

Servo bursts are typically written to the discs during the manufacture of a disc drive using a highly precise servo track writer, which utilizes the heads of the disc drive to write the servo bursts. As the servo bursts are used to define the tracks, it is important to precisely control the position of the heads as the servo patterns are written to the disc surfaces. Thus, a typical servo track writer comprises a positioning system which advances the position of the heads, a laser based position detector which detects the position of the heads and control circuitry which provides the servo information to be written to the servo fields on the discs.

Servo bursts may also be written to the disc with what is known as self-propagating servo writing. In self-propagating servo writing, the radial position signal that is used to servo-control the actuator is derived from measurements of the readback amplitude of servo bursts that were written during a previous step of the servo writing process. Thus, errors in the head position during servo writing appear as distortions away from a desired circular track shape.

As will be recognized, proper radial alignment and or spacing of the tracks on the disc is essential to facilitate reliable operation of the disc drive. While servo track writing techniques such as those described above provide a generally high degree of accuracy in radial track spacing, inaccuracies or errors in track spacing may still occur as the result of the servo writing process. In general, these track inaccuracies occur in two principle forms: dynamic or AC inaccuracies and static or DC inaccuracies. Dynamic or AC inaccuracies typically occur as a result of non-repeatable relative motion between the disc and the head during the servo writing process, which produces non-circular track shapes on the disc. In contrast, static or DC inaccuracies typically occur as the result of low frequency relative motion between the disc and the head during the track writing process and/or various inaccuracies of the track writing equipment. Whereas the effects of DC errors has in the past had minimal impact upon the operation of the servo disc drive, as higher track densities are achieved, such errors become increasingly significant.

There is a need, therefore, for an improved approach to correcting static track pitch in high performance data handling systems. It is to such a need that the present invention is directed.

SUMMARY OF THE INVENTION

The present invention comprises a method for correcting track pitch in a data handling system and an apparatus improved by that method.

In one embodiment, many parallel tracks on a storage surface of a data handling device are arranged in a circular direction. Each track has a track center defined by servo sectors written during the servo track writing process. Each successive pair of track centers has a succession of radial track spacing measured at each servo sector. The average of the succession of radial offsets between a pair of tracks is referred to as static (or DC) track spacing. Due to static track spacing errors, the static track spacing between different pairs of tracks are not equal. The static spacing of the different pairs of tracks has a statistical distribution. The smaller the variance of the distribution, the more even the track spacing. In the preferred embodiment described here a series of correction factors are used to modify the position of the head relative to the nominal track centers defined by the servo writing process. As a result, the head follows a modified (or corrected) track center. The variance of static track spacing between the corrected track centers will be significantly reduced when compared to the variance of track spacing of the original track centers.

Additional features and benefits will become apparent upon a review of the following drawings and the corresponding detailed description.

DETAILED DESCRIPTION

Figure 1:
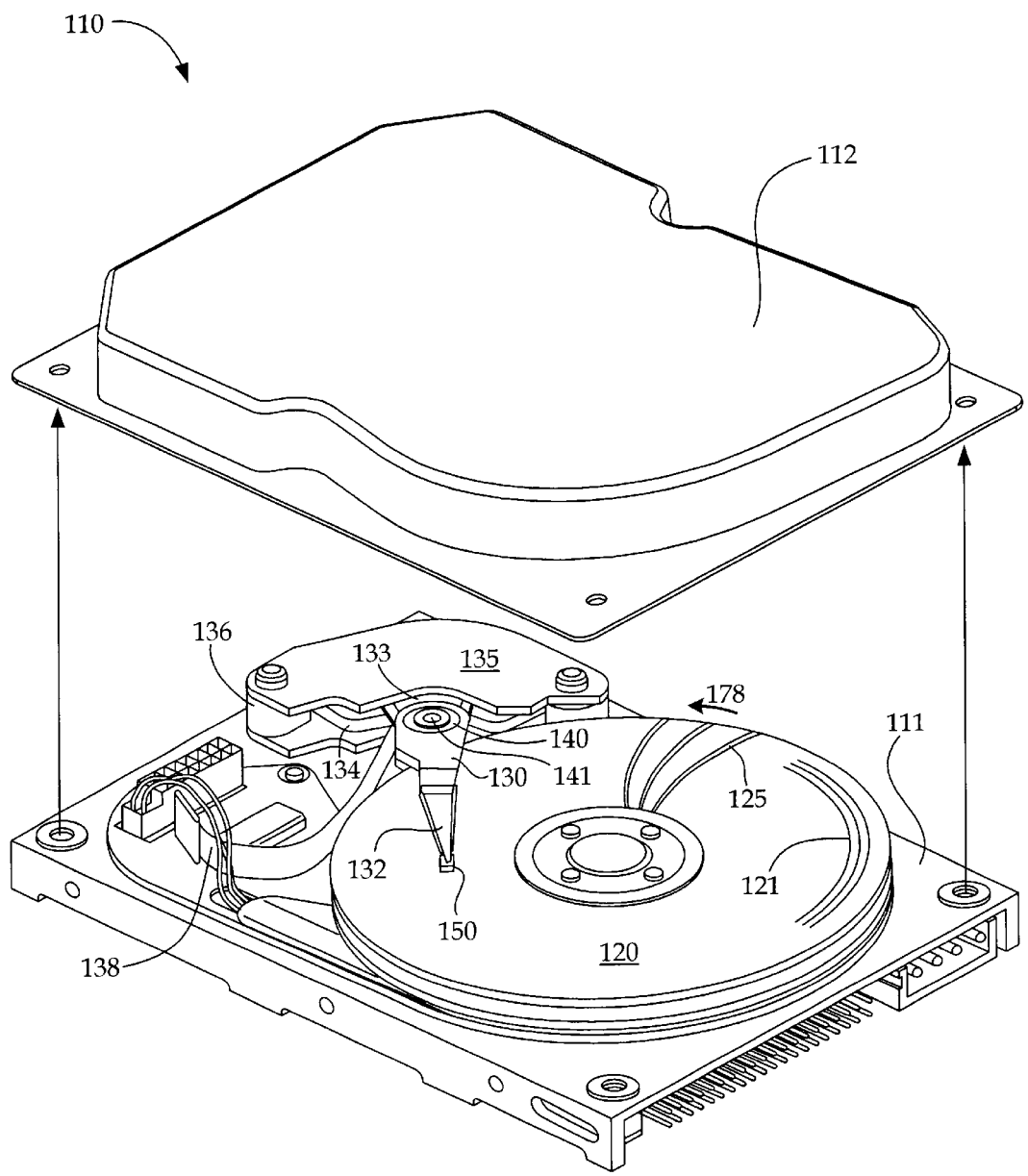
FIG. 1 shows an exploded view of an example of a disc drive upon which the present invention is implemented.

Turning now to the drawings and specifically to FIG. 1, shown is an exploded view of an example of a disc drive 110 in which the present invention is particularly useful. The disc drive 110 includes a deck 111 to which all other components are directly or indirectly mounted and a top cover 112 which, together with the deck 111, forms a disc drive housing which encloses delicate internal components and isolates these components from external contaminants.

The disc drive 110 includes a plurality of discs 120 which are mounted for rotation on a spindle motor (not shown). The discs 120 include on their surfaces a plurality of circular, concentric data tracks 121 on which data are recorded via an array of vertically aligned slider assemblies (one of which is shown at 150). Position reference data, which enables each slider move to and remain over a target data track, is provided in radial servo wedges 125 distributed around each surface of each disc 120. Each slider 150 is supported by a respective load beam 132 attached to arm portions of actuator 130. The actuator 130 is mounted to a bearing assembly 140 which includes a stationary pivot shaft 141 about which the actuator 130 rotates.

Power to drive the actuator 130 about the pivot shaft 141 is provided by a voice coil motor (VCM). The VCM consists of a coil 133 which is supported by the actuator 130 within the magnetic field of a permanent magnet assembly having spaced upper and lower magnets 134. The magnets 134 are mounted to spaced pole pieces 135 which are fixed to the deck 111 and are further spaced from one another by spacers 136. Electronic circuitry is provided on a printed circuit board (PCB, not shown) mounted to the underside of the deck 111. Control signals to drive the VCM are carried between the PCB and the moving actuator 130 via a flexible printed circuit cable (PCC) 138, which also transmits data signals to and from the sliders 150.

Figure 2:
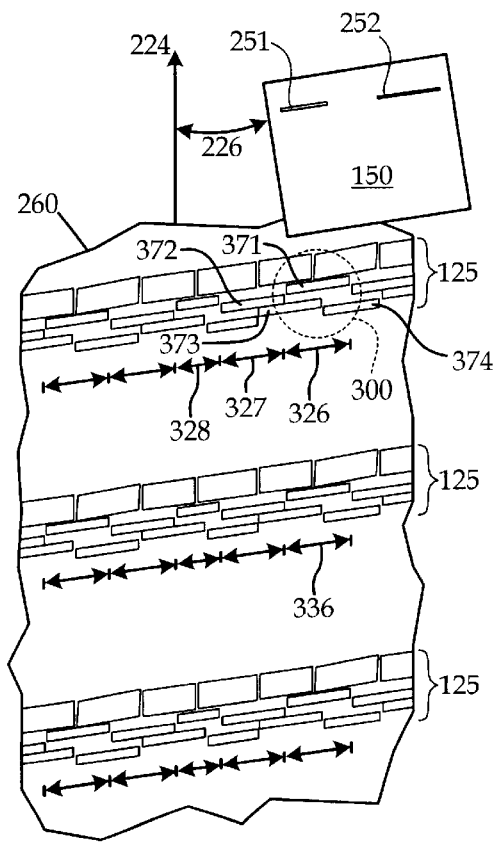
FIG. 2 shows a view of a portion of a data surface of the disc drive.

FIG. 2 shows a view of a portion 260 of a data surface of a disc 120. The portion moves (in direction 224 as shown) adjacent to slider 150. Slider 150 has a read element 251 and a write element 252 radially offset, with read element 251. Typically the read element is closer to the outer diameter of the disc. In an alternative embodiment the reader is closer to the inner diameter of the diskThe rotary actuator 130 supports slider 150 near its innermost position, so that a skew angle 226 of a few degrees is seen. Read element 251 and write element 252 are correspondingly askew from being perpendicular to the circular tracks 121 to be written. A circular portion 300 of one wedge 125 is highlighted for further magnification.

Figure 3:
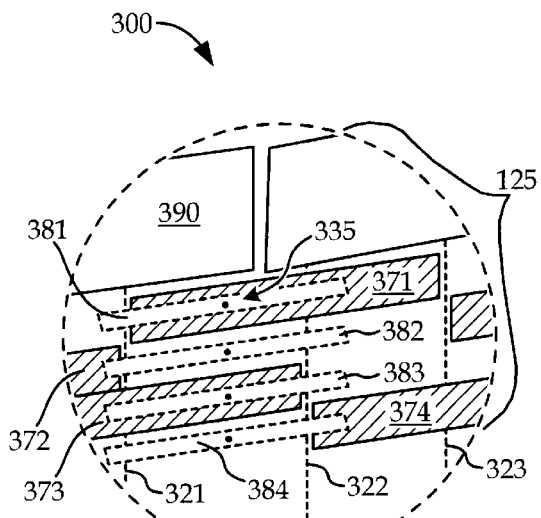
FIG. 3 shows a highly magnified view of a portion of FIG. 2.

FIG. 3 shows a highly magnified view of the circular portion 300 of FIG. 2. Timing, calibration, and track identification information is shown in trapezoidal field 390. A conventional quadrature burst arrangement for fine positioning comprises bursts A, B, C and D (371, 372, 373, 374, crosshatched areas). Slider 150 is held at a stable radial position as the wedge 125 passes under the read element 251, which is shown at four successive positions 381, 382, 383, 384 through which it passes. At position 381, for example, read element 251 is almost entirely within burst 371. A short time later, read element 251 will be at position 382, overlapping the rightmost edge of burst 372. At each of the positions 381, 382, 383, 384, read element 251 generates a signal having a strength that is roughly proportional to the amount of overlap with the respective burst at that position.

Note that a left edge of first burst 371 is substantially aligned along track center 321, offset from a right edge of second burst 372 by only a very narrow erase band. Operating conventionally, a center point 335 of read element 251 would maintain alignment along such a track center. As shown, however, read element 251 overlaps two successive track centers 321,322.

Figure 4:
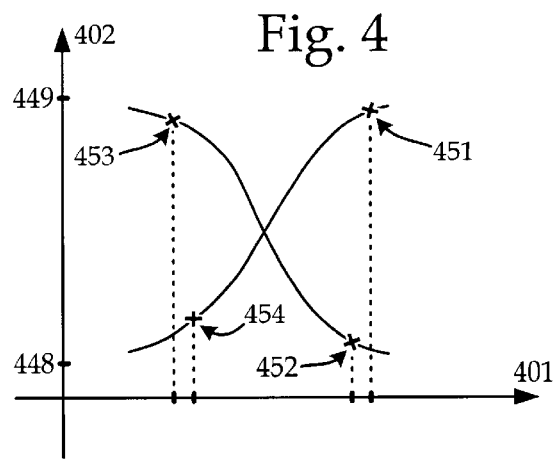
FIG. 4 shows a plot of an amplified readback voltage versus radial position.
Figure 14:
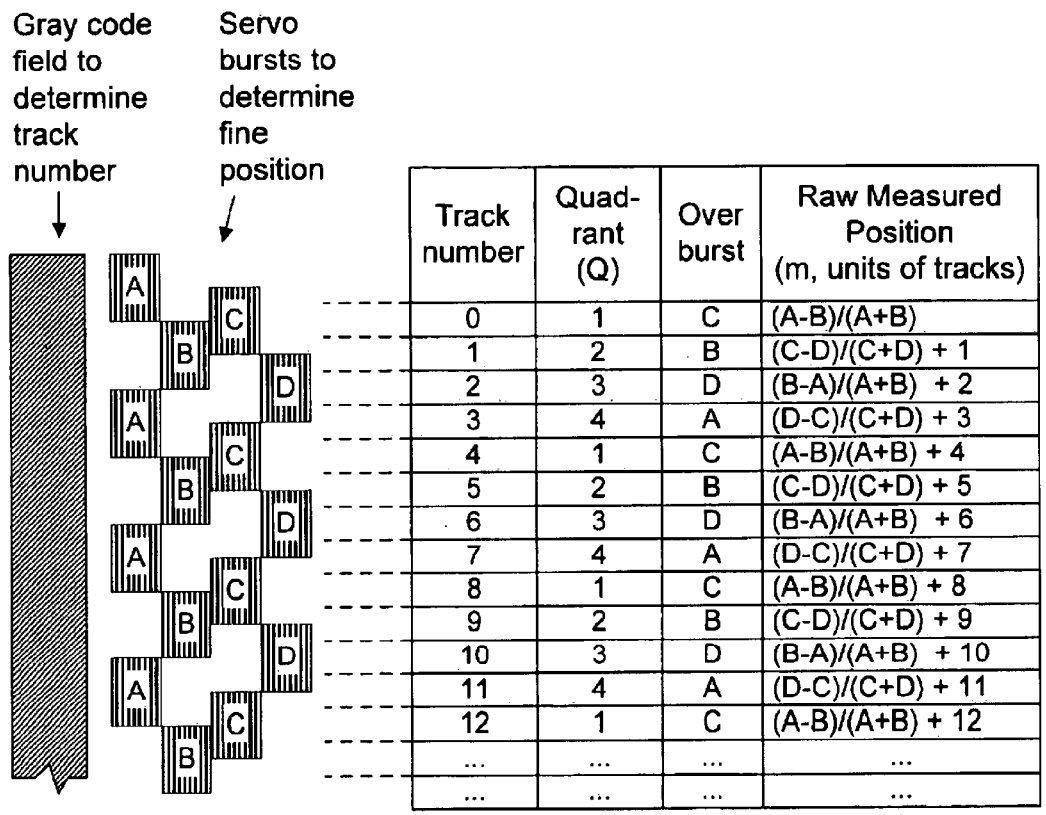
FIG. 14 shows a servo position decoding scheme suitable for use with the present invention.

FIG. 4 shows a plot of an amplified readback voltage 402 against radial position 401. A minimum value 448 of readback voltage is shown, corresponding to a signal received from a read element 251 that is not over the bursts 371, 372, 373, 374. A maximum value 449 of readback voltage likewise corresponds to a signal received when read element 251 fully overlaps one of the bursts 371, 372, 373, 374. Thus, high values 451,453 (i.e. near 449) will be seen from positions 381 and 383. Low values 452,454 will likewise be seen from positions 382 and 384. The position of the head relative to the servo bursts can be estimated by measuring the magnitude of the signal generated by the bursts as the head travels through the pattern. A servo burst decoding scheme is shown in FIG. 14, for example, suitable for use where position measurements are fairly linear. In other cases appropriate linearization functions may be used, several of which are known in the art. For ease of understanding it will be assumed that the position decoding scheme used has the following properties:

1. The position information value changes by 1 when the head moves from one track center to the nearest track center assuming the distance between the tracks is equal to the nominal track spacing.

2. The position measurements obtained from a particular burst pair is not influenced by the bursts defining the adjacent track center.

3. Position information from a particular burst pair can be obtained accurately if the distance of the center of the read element from the track center is less then $0.5+e_{tr}/2+e_{PES}$, where $e_{tr}$ is the largest track spacing error after servo track writing, and $e_{PES}$ is the largest deviation of the head from its nominal position during track following (i.e. the track following position error of the servo systyem).

It should be noted however, that the method proposed in this invention can be accommodated to other position decoding schemes that do not satisfy these assumptions.

When the read head is positioned at the border of two quadrants (for example as shown on FIG. 3) the head overlaps both the AB and CD transition, and therefore, and therefore the position of the head can be measured based on either the AB burst pair or the CD burst pair.

Let read head been positioned between track k and track k−1. Note that one of the tracks adjacent to the head position is defined by the transition between A and B bursts, while the other track adjacent to the head is defined by the transition between the C and D bursts.

If at a particluar point the distance between adjacent tracks is equal to the noninal track spacing, then the position measurements based on the burst transitions belonging to track k and track k−1 are equal. However, if the distance between two adjacent tracks are not equal to the nominal track spacing then the position measurements obtained from the AB and CD burst pairs are not equal. Thus, the difference between the position measurement based on the AB and CD burst pairs can be used to derive the track spacing errors between the adjacent tracks as follows:

$$s_{k,l}=x_{k,l}-x_{k-1,l} \quad (1)$$

In the sequel the first subscript denotes track numbers, and the second subscript denotes servo sector numbers, i.e. it identifies the circumferential position. $x_{k,l}$ denotes the measured position based on the burst pair that defines track k at sector l, $x_{k-1,l}$ denotes the measured position based on the burst pair that defines track k−1 at sector l, and $S_{k,l}$ denotes the track spacing error (or squeeze) between track k and track k−1 at sector l.

Let as assume that there are N servo sector around the circumference of the disk, numbered from 1 ... N. The static or DC part of the track spacing error between two adjacent tracks can be derived as:

$$D_k = \frac{\sum_{i=1}^{N} S_{k,i}}{N} \quad (2)$$

If the distance between track k and track k−1 is equal to the nominal track spacing, then $D_k=0$. However, if the tracks are closer than the nominal distance, then $D_k>0$. Similarly, if the static spacing of track k and track k−1 is larger than the nominal track pitch, then $D_k<0$.

The dymanic or AC part of the track sapcing error between two adjacent tracks at a particular sector can be derived as:

$$a_{k,i}=S_{k,i}-D_k \quad (3)$$

Note that the dynamic track spacing error is different at each sector. For easier notation the dynamic track spacing values can be combined in a vector as folios:

$$A_k=[a_{k,1},a_{k,2},\ldots,a_{k,N}] \quad (4)$$

Figure 5:
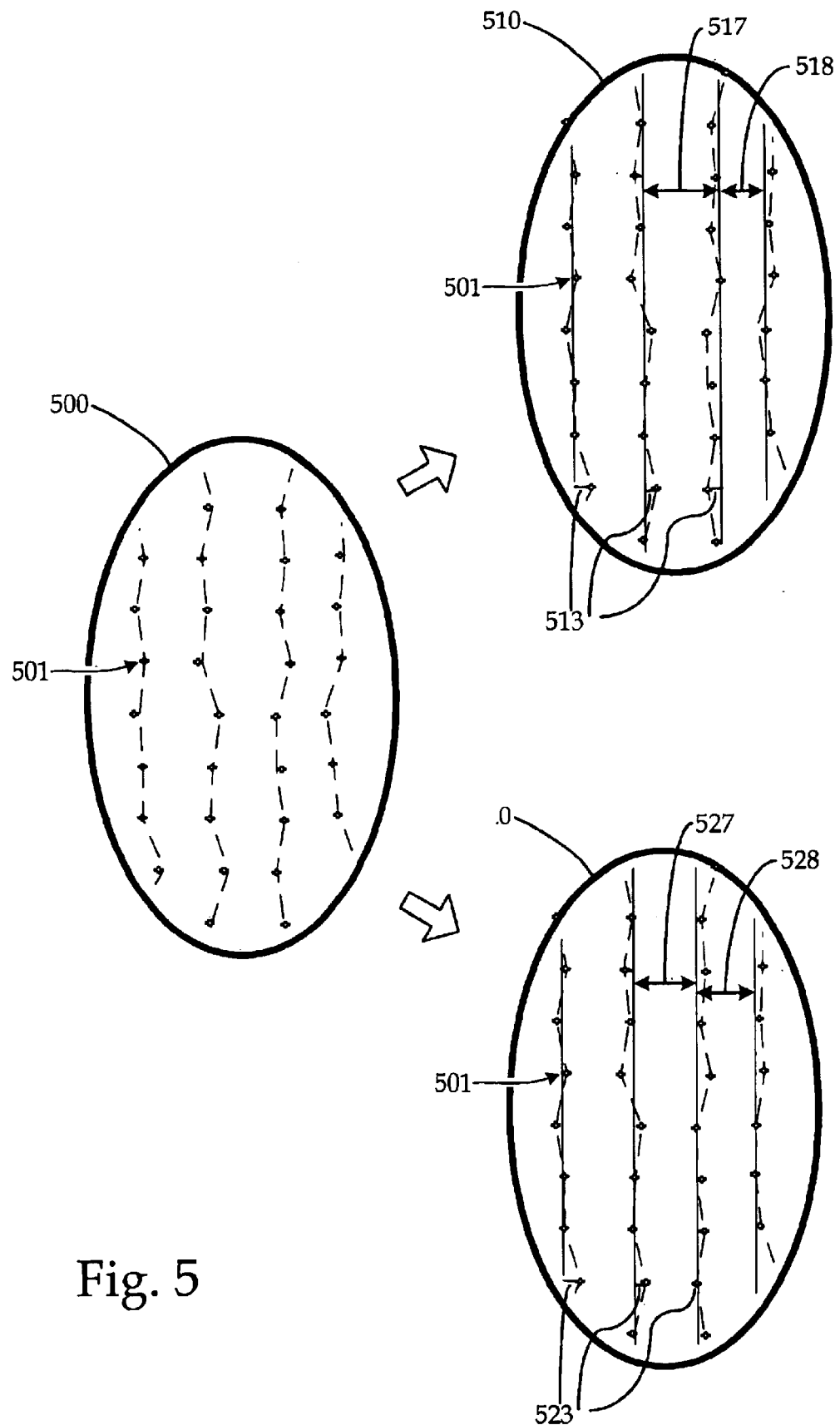
FIG. 5 compares a prior art track correction method with a method of the present invention.

FIG. 5 compares a prior art track spacing correction method with a method of the present invention. Region 500 shows the track centers defined by several servo marks 501 which can be constructed as the burst transitions 321,323 shown in FIG. 3. On this figure the head moves in the vertical direction, thus the tracks are along the vertical direction. Note that the marks 501 are not uniformly arranged in straight vertical lines, but are written in with some degree of error due to inaccuracies of the servo track writing process. Region 510 shows the same track 501, the dashed lines marking the original track centers, and the solid lines marking the adjusted track centers. The adjusted track centers are obtained by adding a correction factor 513 to the measured head position, methods for which are known in the art. These adjustments effectively remove the dynamic track spacing errors. Typically, the correction factors are determined during or after the servo track writing process, and they are written back on the disks. In a typical embodiment each servo sector has a dedicated field where the correction factors are stored.

The prior art track shape correction methods removed only the non-circularity of each track, i.e. it corrects only the dynamic (or AC) track shape errors. However, this method did not correct the static (or DC) track spacing errors, i.e. the average distance between two adjacent tracks 517, 518. Thus, track spacing 517 and 518 may not be equal.

Region 520 shows the same marks 501, but uses a different set of correction factors 523 to insure equal spacing between successive track centers. As a result, the track spacing 527 and 528 are about equal, i.e. the track spacing is substantially uniform.

Figure 6:
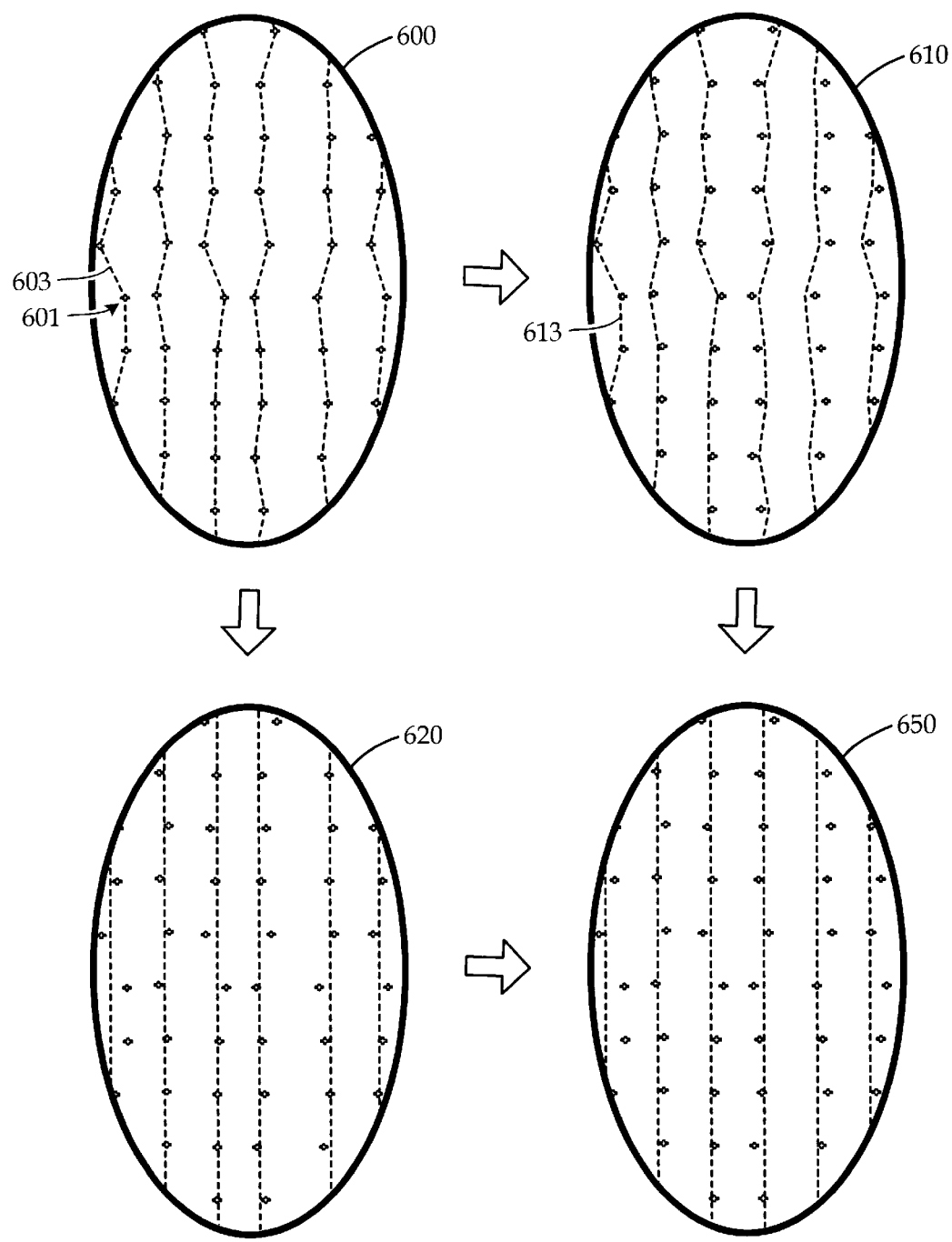
FIG. 6 shows an overview of two alternative methods of the present invention, each involving two passes across each disc surface.

FIG. 6 shows an overview of two alternative methods of the present invention, each involving two passes across each disc surface. Region 600 shows several position reference marks 601 connected by dotted lines 603 signifying the path along which the servo system attempts to position the head. In the first method, in the first pass, all of the offset values in each path are offset radially by the same amount. The result is shown in region 610. The resultant path 613 is essentially a crooked path having an average radius such that the average offset between successive track centers isequalized. In a second pass, non-circularity errors are reduced so as to obtain circular, uniformly dispersed paths as shown in region 650.

In another method of the present invention, non-circularities are reduced in a first pass, according to the prior art method depicted in FIG. 5. The result is shown in region 620. In a second pass, offsets between successive tracks centers are measured and normalized. One disadvantage of this later method is that the AC correction is performed with the head traveling in a substantially different portion of the disc. With this approach, non-linearities in head behavior (like that shown in FIG. 4) cause small (non-circularity) errors to remain after the second pass.

Figure 7:
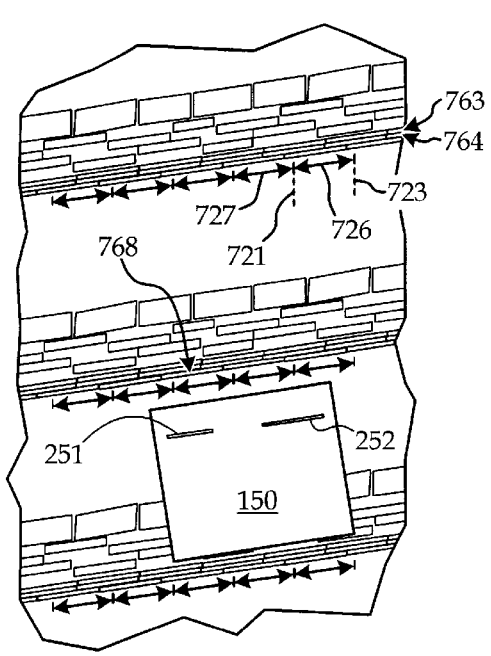
FIG. 7 shows a region of FIG. 2, modified by the inclusion of offset values that effectively create shifted transitions for a normalized distribution of inter-track offset values.

FIG. 7 shows region 260 of FIG. 2, modified by the inclusion of digital correction factors 763,764. Each servo sector has a dedicated field where the correction factors are stored. This effectively shifts the track center to equalize the spacing bettween track centers. By "equalized" it is meant that the spacing modified track centers is more uniform than the distance between the non-corrected track centers. of FIG. 2. Note that the correction values 763,764 are substantially aligned with adjusted track centers 721,723, so that the read head 251 can read the correction values 763,764 as it tries to follows the track center 721. This insures that during read operation the read head follows the corrected track center, and it is commonly referred to as "read ZAP," where ZAP is an acronym for "zero acceleration path."

In the example of FIG. 7, another field is provided for offset values 768 to be aligned with the read head 251 while the write head 252 is aligned with the track center 721. This is called "write ZAP." As shown, slider 150 is in position for writing. Write head 150 is radially aligned (horizontally as shown) with track center 721. Note that the correction of track centers according to the present invention can apply to "read ZAP" fields, "write ZAP" fields, or both.

Figure 8:
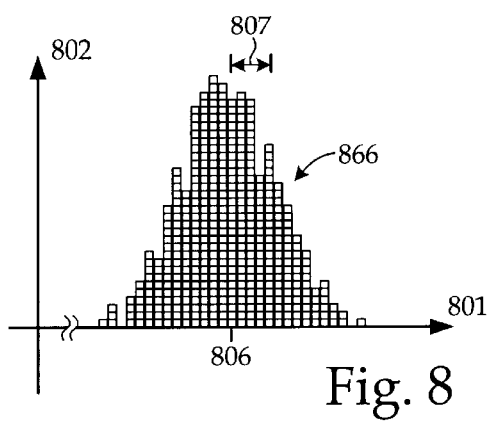
FIG. 8 shows a histogram plot of the offset values non-adjusted values of FIG. 2, plotting frequency of occurrence against offset distance.

FIG. 8 shows a histogram plot of the non-corrected track spacing 326,327 between various tracks of FIG. 2. Frequency of occurrence 802 is plotted against (increments of) track spacing 801. From this set of values, one can calculate a mean 806 (denoted as M) and a variance V3 (calculated as standard deviation 807 squared).

Figure 9:
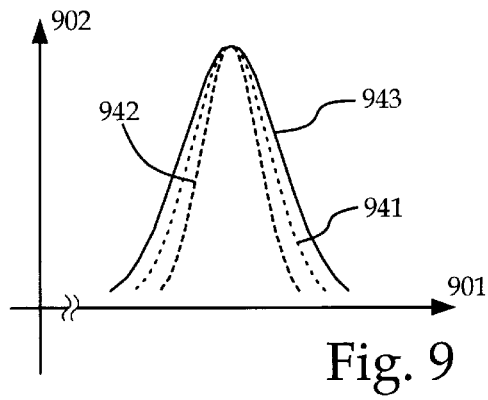
FIG. 9 shows a probability distribution of offset values having a mean and variance as computed from the data plotted in FIG. 8.

FIG. 9 shows a probability distribution 943 of track spacing values having the mean M and variance V3 as computed from the data plotted in FIG. 8. Normalized probability 902 is plotted against track spacing 901, substantially to scale. This distribution models the data plotted in FIG. 8 as a Normal distribution. Also shown in FIG. 9 are the dynamic component 941 and the static component 942 of the distribution. Both are depicted with a mean M and a normalized amplitude. The dynamic component 941 has a variance V1, a measure of the dispersion of inter-track offset distances between each pair of successive track centers. The static component 942 has a smaller variance V2, a measure of the dispersion of the actual track widths (or average radial distances between pairs of tracks). Note that V1+V2 will equal V3, according to the parallel axis theorem, if V1 and V2 arise from independent causes.

Figure 10:
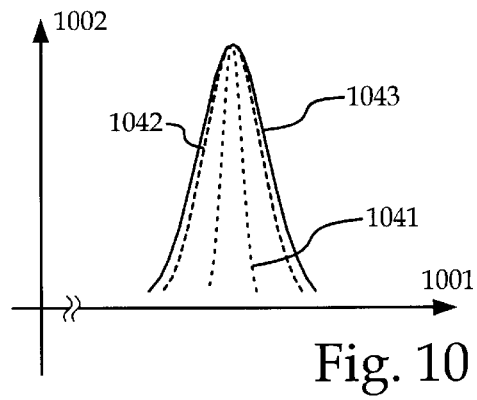
FIG. 10 shows a probability distribution in which values are shifted by methods of the prior art, as depicted in the upper part of FIG. 5.

FIG. 10 shows a probability distribution 1043 of track spacing values of a data storage device with servo written track centers corrected by methods of the prior art, as depicted in region 510 of FIG. 5. Normalized probability 1002 is plotted against track spacing 1001, substantially to scale. Mean M is unchanged from the non-adjusted distribution of FIG. 8. The variance of the dynamic component 1041 is greatly reduced from its non-adjusted distribution 941. Unfortunately, the variance of the static component 1042 is substantially unchanged from its non-adjusted distribution 942. Even though the variance of the dynamic component 1041 has been reduced significantly, and it is much smaller than that of the static component 1042, the variance of the overall distribution 1043 is still significant as shown.

Figure 11:
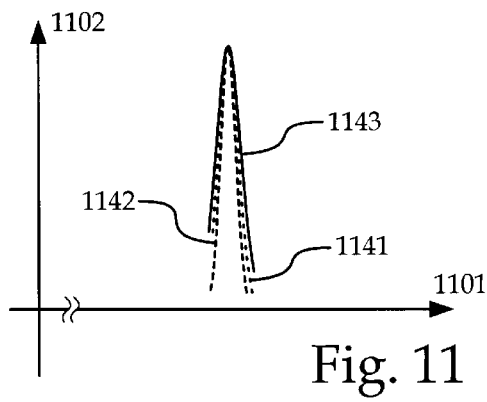
FIG. 11 shows a probability distribution in which values are shifted by a method of the present invention, as depicted in the bottom part of FIG. 5.

FIG. 11 shows a probability distribution 1143 of offset values of a data storage devices with servo written track centers corrected by a method of the present invention, as depicted in region 650 of FIG. 6. Normalized probability 1102 is plotted against track spacing 1101, substantially to scale. The variance of the dynamic component 1141 is reduced to the same degree as for the dynamic component of distribution 1043. Additionally, the variance of the static component 1142 is reduced to be within about 50% of that of the dynamic component 1141. As a result, the total variance 1143 is much more effectively reduced than could have been achieved solely by correction of the dynamic component 1141.

Figure 12:
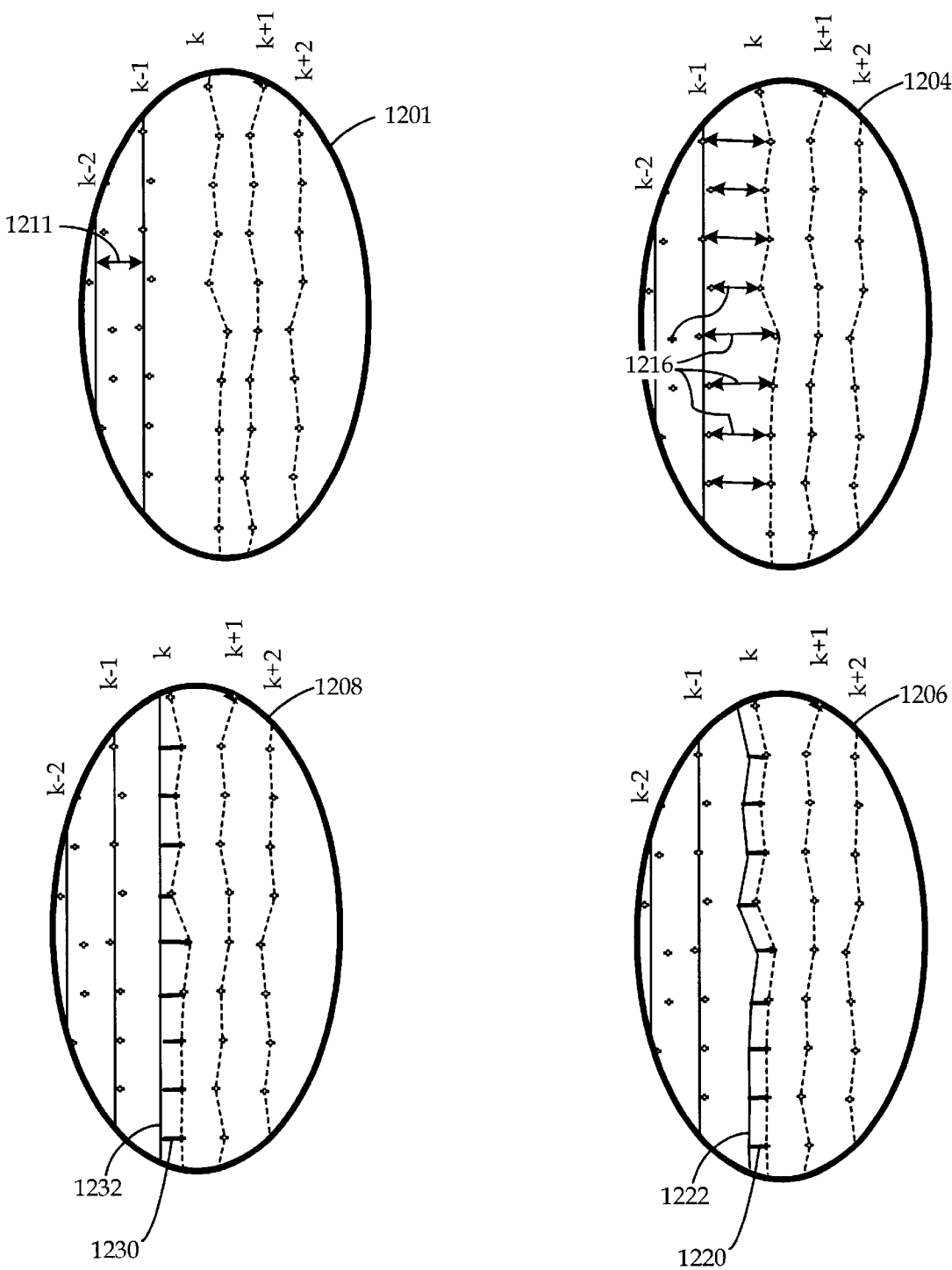
FIG. 12 shows four successive states 1202, 1204, 1206, 1208 of a region of a data storage medium as it is being self-written according to an embodiment of the present invention.

FIG. 12 shows four successive states 1202, 1204, 1206, 1208 of a region of a data storage medium as the static and dynamic track spacing errors are being corrected according to an embodiment of the present invention. In state 1202, the static and dynamic errors of tracks k−2 and track k−1 have already been corrected. Thus track k−1 and track k are perfectly circular (straight lines on the figure) and have nominal spacing 1211. Track k, k+1 , . . . have not been corrected yet. Therefore, they include significant dynamic error (not circular track shape) and the track spacing is also incorrect.

In state 1204, many the track track spacing values 1216 are measured and calculated at each sector according to equation 2. In state 1206 appropriate correction factors 1220 are calculated and applied at each servo sector of track k to modify the nominal track center of track k. This insures that the static track spacing between track k−1 and the modified track center 1222 of track k will be equal to the nominal track spacing.

In state 1208 ZAP correction is applied at the modified track center 1222 to correct dynamic track shape errors. The ZAP correction factors are added to the static correction factors 1220 to obtain a new set of correction factors 1230, which results in a circular track shape 1232.

Figure 13:
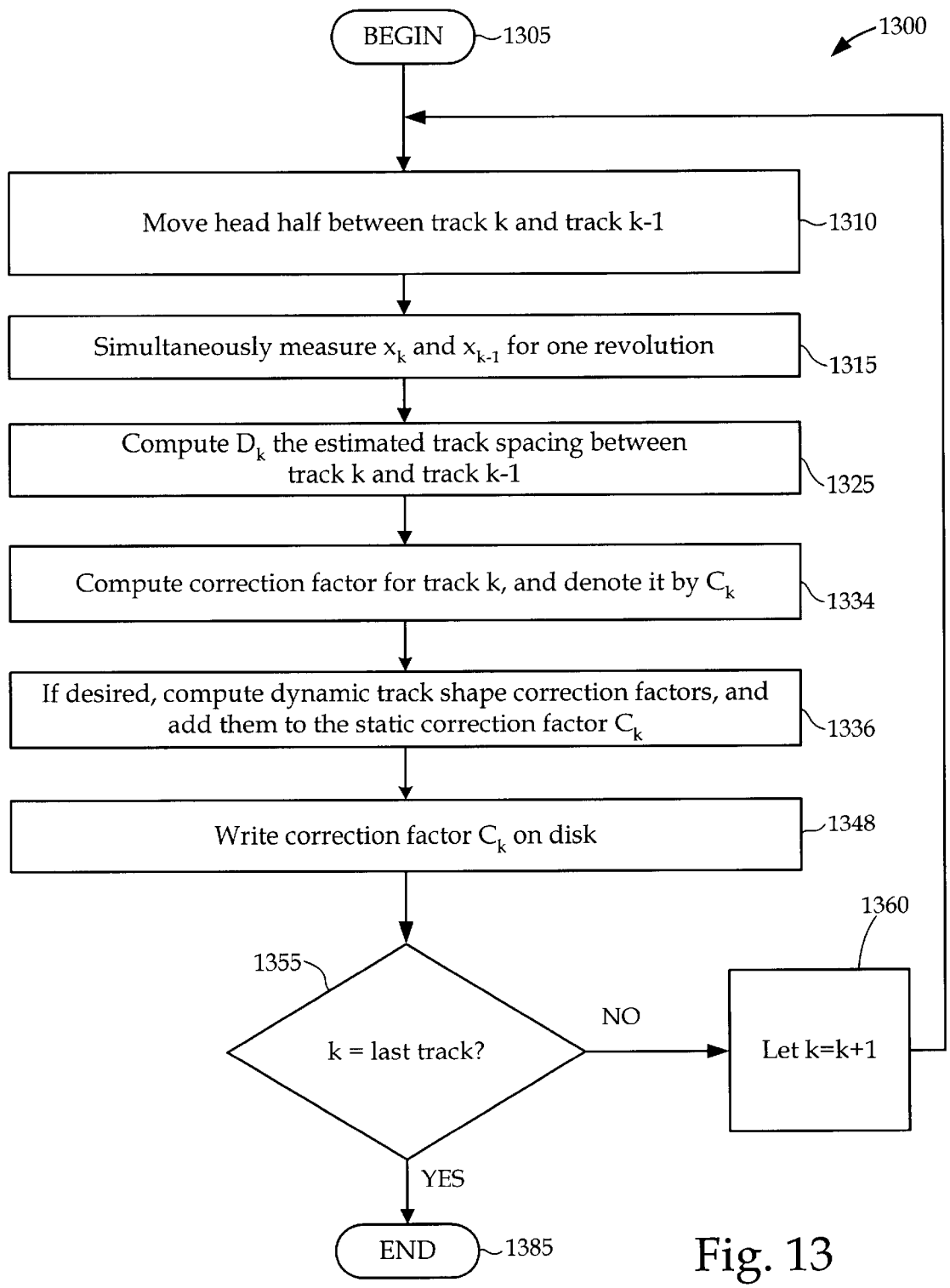
FIG. 13 shows a flowchart of a method of the present invention for normalizing the track pitch of the data surface comprising the region 260 of FIG. 2.

FIG. 13 shows a method 1300 of the present invention for correcting static and dynamic track spacing errors of the data surface comprising region 260 of FIG. 2. The method 1300 comprises steps 1305 through 1385.

The operation starts at the "begin" block 1305. It is assumed that operation starts at track k, and that tracks 0 . . . k have already been corrected. The execution passes to block 1310. In this step the read element is positioned half way between track k and track k−1. Then operaion passes to step 1315.

In step 1315 position measurement is simultaneously obtained based on the servo marks at track k and track k−1 for one revolution. These position measurements are denoted as $x_{k,l}$ and $x_{k+1,l}$. The position measurements are computed using one of the prior art servo detection schemes, for example the one shown in FIG. 14. In step 1325 the estimated static track spacing $D_k$ is obtained according to Equation 2.

In step 1334 the static track spacing correction value is calculated. Typically, the correction value are determined as $C_k$=K$D_k$, where the typical value of constant K is 0.3 . . . 1. This correction value is then added to the head position measurement at each servo sector of track k, which modifies the nominal track center such that the static track spacing error between track k−1 and track k will be reduced. In optional step 1336 the dynamic track shape correction factors are computed and added to the static correction factor at each servo sector.

In step 1348 the static and dynamic correction factors are written on the disk. During normal operation of the disk drive these correction factors are read as part of the servo sectors and added to the measured position, thus correcting the static and dynamic track spacing errors. In step 1355 it is examined whether all the tracks on the disk drive have been corrected. If yes, then the process terminates. If not, then operation passes to block 1360. In step 1360 the value of k is incremented, operation is passed to 1310, and the procedure is repeated.

FIG. 14 shows a simple servo burst decoding scheme suitable for use with any embodiment of the present invention where position measurements vary linearly with position.

Figure 15:
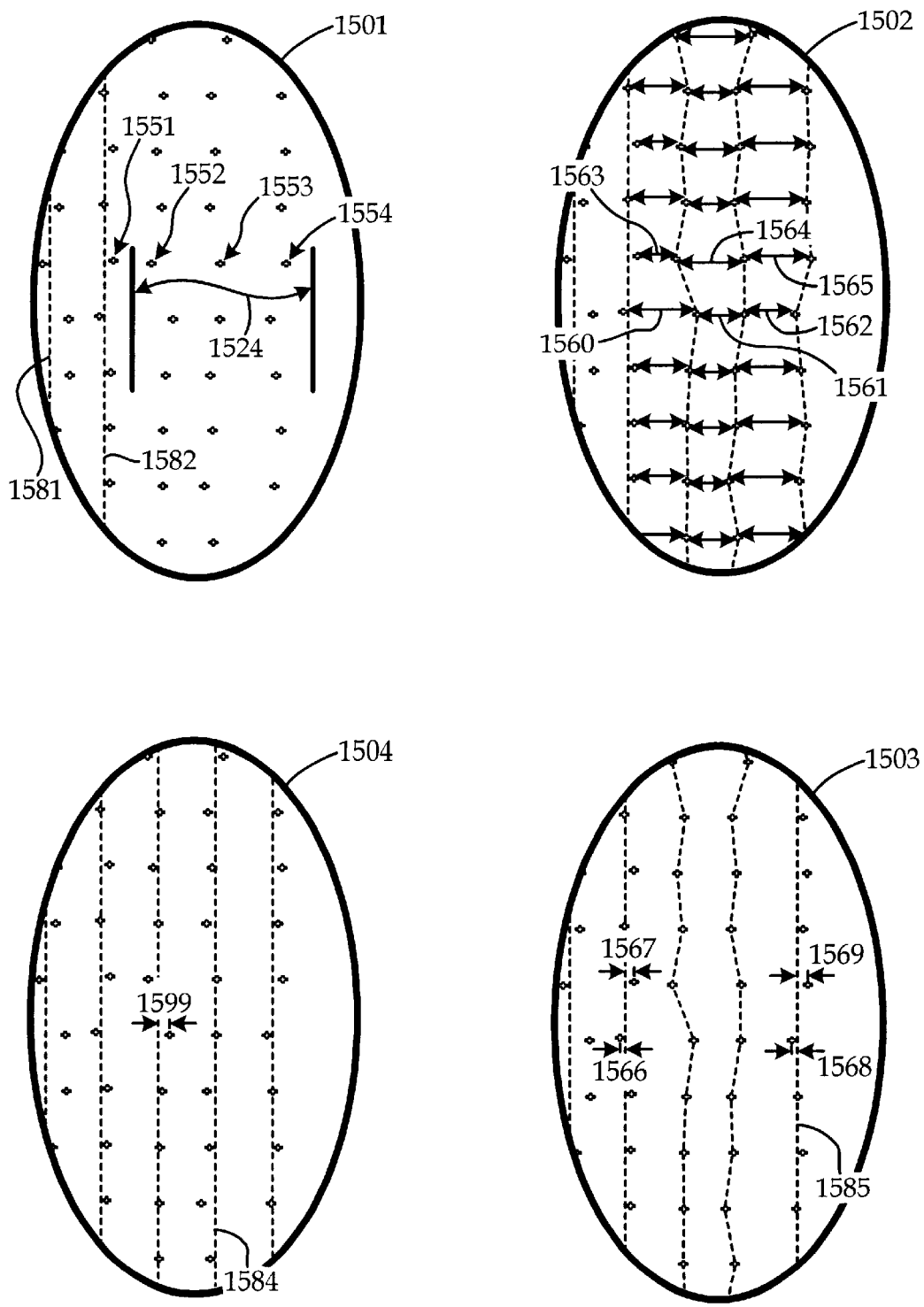
FIG. 15 shows four successive states 1501, 1502, 1503, 1504 of a region of a data storage medium as it is being self-written according to another embodiment of the present invention.

FIG. 15 shows four successive states 1501, 1502, 1503, 1504 of a region of a data storage medium as it is being self-written according to an embodiment of the present invention. In state 1501, many track center reference positions including those of track centers 1581 and 1582 are already shifted to provide very uniform longitudinal tracks. Additional (non-adjusted) reference positions 1552, 1553, 1554 for additional tracks to be laid down in region 1524. As shown, note that a reader/writer offset distance should exceed a lateral inter-track offset distance by at least three times.

In state 1502, many non-adjusted inter-track offset values 1560, 1561, 1562, 1563, 1564, 1565 are measured during several passes by a read element through the region 1524. In state 1503, a conventional ZAP correction process has been performed, obtaining lateral adjustment values 1568,1569 and reducing dynamic irregularity in the last-written track 1585.

Moving now to state 1504, shown there are earlier-written tracks 1584 having a reduced dynamic irregularity. Unlike any methods of the prior art, this reduction has been accomplished by interpolation. This can be a simple arithmetic combination of known values, quite unlike the time-consuming process of conventional ZAP correction on each track. To see a specific example, let offset distances 1560 through 1565 be abbreviated as V0 through V5, respectively. Also, let lateral adjustment values 1566 through 1569 be abbreviated as V6 through V9, respectively. By a brief examination of states 1502 and 1503, one can readily see that three times an inter-track offset (i.e. between 1582 and 1585) can be estimated as (V3 +V4+V5+V7−V9) or as (V0+V1+V2+V8−V6).

With these observations, one of ordinary skill can derive suitable lateral adjustment values (such as 1599) to provide substantially uniform track spacing in region 1524. For example, the specific value indicated at 1599 can be estimated as (2V0−V1−V2−2V6−V8)/3.

Suppose that, due to an error, no value of V0 is available. In this case, another lateral adjustment value 1599 can alternatively be estimated as (2V3+2V4+2V5+2V7−3V1−3V2−3V8−2V9)/3. In general, one of ordinary skill can very readily derive a suitable lateral adjustment value as an arithmetic combination of whatever measured lateral offset distance values are available. For accurate interpolation or extrapolation, of course, it should be preferred that there are many such measured values.

Figure 16:
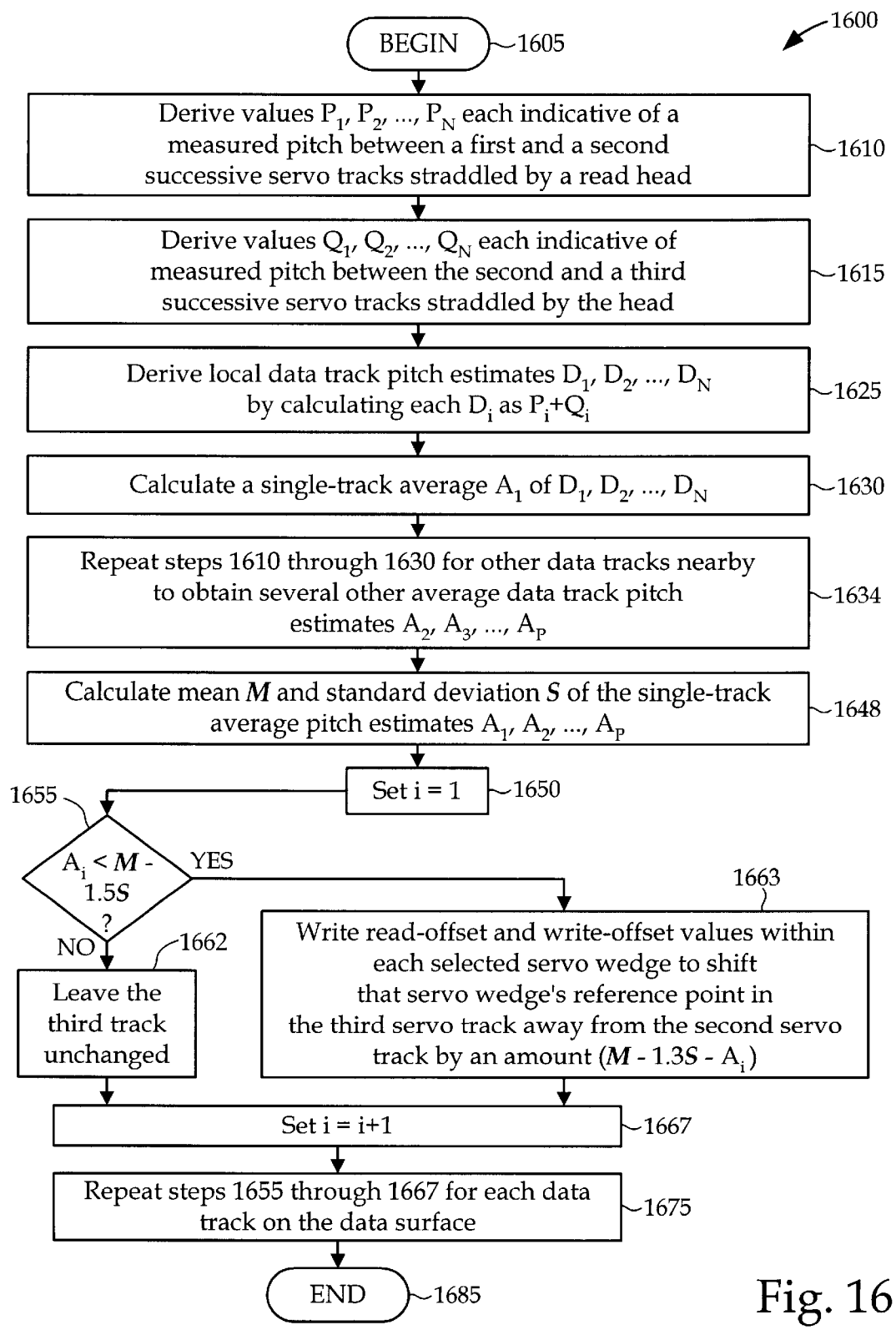
FIG. 16 shows a flowchart of a method of the present invention for normalizing track pitch.

FIG. 16 shows a method 1600 of the present invention for normalizing the track pitch of the data surface comprising region 260 of FIG. 2. The method 1600 comprises steps 1605 through 1685. Read head 251 is positioned to straddle first and second successive servo track centers 321,322 as shown in FIG. 3. Offset distance values $P_1, P_2, \ldots, P_N$ are derived 1610 indicating the servo track pitch between the successive servo track centers 321,322. In step 1615, head 251 is repositioned to straddle the second and third successive track centers 322,323 to measure another set of offset distance values $Q_1, Q_2, \ldots, Q_N$. In step 1625, these are combined pair-wise by calculating each $D_i$ as $P_i+Q_i$. In steps 1630 and 1634, a series of single-track data track pitch estimates $A_1, A_2, A_P$ are derived.

If the P pitch estimates $A_1, A_2, \ldots, A_P$ pertain to a series of P+1 successive data tracks, for example, Al represents a pitch between the centers of the first and second data tracks. $A_1$ can be calculated as $(D_1+D_2+\ldots+DN)/N$. $A_2$ can be calculated as an average of similar pitch measurements between the second and third data tracks. From this distribution of pitch estimates $A_1, A_2, \ldots, A_P$, a mean M and standard deviation S are calculated 1648.

A data track identifier i is set to an initial value 1650, and the initial track pitch $A_1$ is compared against a "too narrow" threshold 1655. Note that threshold may be an arbitrary value such as 0.993 * a nominal track pitch, for expedience, and need not be derived from a calculated mean M and standard deviation S. If the initial track pitch $A_1$ is wide enough, it is not adjusted 1662. If it is too narrow, in step 1663, it is increased to a value closer to the mean M. In either case, the data track identifier is incremented 1667 and the process is repeated for additional tracks on the data surface 1685.

Alternatively, one embodiment of the present invention is a method of normalizing track density in a data storage device such as a tape drive or a disc drive 110. On a data surface in the device, many parallel tracks (such as 151) are arranged longitudinally. Each track has a track center comprising many latitudinal reference points (such as 321,501) for fine positioning. Each successive pair of track centers (such as 321,323) having a succession of lateral offset distance (such as 326,336) having an average. Because there are many successive pairs of tracks, there are many average lateral offset distances (such as 843) defining a statistical distribution (such as 943) having a variance (such as 807 squared).

The device (such as 110) includes a laterally movable transducer head (such as 150) and a longitudinally movable data surface (such as the top surface of disc 150). A signal is received (such as in steps 1610 and 1615) from the transducer head while the data surface moves past the head. Many values (such as 866) each indicative of a lateral offset distance (such as 326,336) between a corresponding pair of lateral reference points (such as 321,323) are derived from the received signal. These offset-indicative values are used to shift at least some of the latitudinal reference points (such as 321,323) laterally (i.e. to 721,723) so as to reduce this variance. Preferably, this first embodiment is implemented in combination with the track shaping control system of (practitioner docket STL9950 by Gabor Szita, filed on even date herewith).

In a second embodiment implemented in a disc drive, several refined compensation values (such as 1566,1567 of FIG. 15) shift a center of a selected track N (such as 1582). Several unadjusted inter-track offset values (such as 1560 through 1565) are then measured for an adjacent region (such as 1524) including an offset track N+S (such as 1585). The transducer is maintained over the offset track while rotating the data surface several times and while a deriving a second set of several compensation values shifting the center of the offset track. Then, the compensation values are written so that they can be read while maintaining a slider over track N+S (e.g. as 768 is shown in FIG. 7).

Preferably, the selected track and the offset track have at least one intermediate track N+1 between them. Compensation values for the intermediate track (such as 1599) are not derived by the time-consuming process used for the offset track, but are derived and written in less than three rotations by an interpolation based upon the recorded values.

In a third embodiment, an indicator Is of a selected track pitch is derived by averaging a first group of the many offset-indicative values (such as 326 and 336 of FIG. 3). Each value of the first group is derived from a measured offset within the selected track pitch. Then, a first indicator $I_{N1}$ of a nominal track pitch (such as 806 of FIG. 8) is obtained by averaging a second group of the many offset-indicative values, at least one value of the second group being derived from a measured offset (such as 327) not within the selected track pitch. The selected track pitch is shifted by an amount that depends upon the difference between indicators $I_s$ and $I_{N1}$ (such as by the method 1600 of FIG. 16). To account for irregularities of the different radial zones of a disc, it is preferred that a second indicator indicator $I_{N2}$ of another nominal track pitch is later derived by averaging a third group of the many offset-indicative values. The third group includes at least one value (such as 328) that is not a member of the second group, thereby implementing a moving average to be used elsewhere on the data surface.

In a fourth embodiment, a slider (such as 150) with a reader/writer offset that is wider than the reader element (such as 251) is used. In this configuration, a latitudinal reference point is shifted by writing an adjustment value (such as 768 of FIG. 7) that is laterally offset from the corresponding latitudinal reference point to be shifted (such as 321) by an offset that is wider than the reader element. Preferably, the adjustment value is written in the same contiguous servo data region (e.g. a radial, arcuate servo wedge 155 as shown in FIG. 1) in which the point to be shifted resides.

In a fifth embodiment, each time data is received from a read element (such as 251), the element is maintained in a lateral position (as shown in FIG. 3) straddling a pair of the latitudinal reference points. Many lateral measurements for a selected track pitch are collected and averaged. A similar average is measured for each of several other selected track pitches, the pitch averages defining a statistical distribution. A mean (such as 806) and a spread indicator (such as 807) are calculated for the distribution. Extreme values (such as those that differ from the mean by more than 3 times the spread indicator) are then selected for normalization.

A sixth embodiment of the present invention is a disc drive (such as 110). The lateral offset distances, in this case, are substantially radial relative to an axis of rotation of a disc in the disc drive. The longitudinal tracks (such as 151) are nominally circular about the axis. The disc drive includes means (such as 763, 764, 768) for normalizing the track density of the data storage device, especially by reducing the variance of its static component (such as 942) by at least 1% to 5%. The normalizing means may alteratively include a step for re-writing some of the reference points when the variance exceeds a predetermined threshold.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, while the various embodiments of the present invention have been described with respect to a disc drive, the present invention is also applicable to, and may be implemented in, other data storage devices such as optical disc drives and magneto-optical disc drives. Numerous other changes may be made which will readily suggest themselves to those skilled in the art and which are encompassed in the spirit of the invention disclosed and as defined in the appended claims.

What is claimed is:

1. A method of correcting a track density in a data storage device, the device including a laterally movable transducer head and a longitudinally movable data surface, the method comprising steps of:
   (a) receiving a signal from the transducer head while the data surface moves adjacent to the transducer head;
   (b) deriving from the received signal of step (a) many values each indicative of a corresponding offset between a corresponding pair of latitudinal reference points on the data surface, the reference points laterally distributed across a series of many longitudinal tracks on the data surface, the many longitudinal tracks defining many successive pairs of the tracks each having an average lateral offset distance therebetween, the many average offset distances defining a statistical distribution having a variance; and
   (c) shifting at least some of the latitudinal reference points laterally by using the offset-indicative values derived in step (b) so as to reduce the variance of said statistical distribution.

2. The method of claim 1 in which the shifting step (c) comprises steps of:
   (c1) recording a first set of several compensation values shifting a center of a selected track N;
   (c2) recording several unadjusted inter-track offset values between a center of track N and a center of an offset track N+S;
   (c3) maintaining the transducer over track N+S while rotating the data surface several times and while a deriving a second set of several compensation values shifting the center of track N+S; and
   (c4) writing the second set of compensation values so that they can be read while maintaining a slider over track N+S.

3. The method of claim 2 in which S=1.

4. The method of claim 2 in which S>1 and in which the shifting step (c) further comprises steps of:
   (c5) deriving an interpolated offset for an intermediate track N+1 by arithmetically combining at least one of the compensation values with at least one of the offset values and at least some of the refined compensation values; and
   (c6) positioning the transducer adjacent track N+1; and
   (c7) within three disc rotations of completing step (g), writing the interpolated offset so that it can be read while maintaining a transducer over track N+1.

5. The method of claim 1 in which the deriving step (b) includes steps of:
   (b1) deriving an indicator $I_S$ of a selected track pitch by averaging a first group of the many offset-indicative values, each value of the first group being derived from a measured offset within the selected track pitch; and
   (b2) deriving a first indicator $I_{N1}$ of a nominal track pitch by averaging a second group of the many offset-indicative values, at least one value of the second group being derived from a measured offset not within the selected track pitch.

6. The method of claim 5 in which the shifting step (c) includes a step (c1) of shifting the selected track pitch by an amount that depends upon a difference between indicators $I_S$ and $I_{N1}$.

7. The method of claim 5 in which the deriving step (b) further includes a step (b3) of deriving a second indicator $I_{N2}$ of a nominal track pitch by averaging a third group of the many offset-indicative values, at least one value of the third group not being a member of the second group (thereby implementing a moving average).

8. The method of claim 1 in which the shifting step (c) includes, for each latitudinal reference point shifted, a step (c1) of writing a corresponding adjustment value that is laterally offset from the latitudinal reference point by an offset that is wider than the transducer head.

9. The method of claim 1 in which the shifting step (c) includes, for each latitudinal reference point shifted, an iteration of steps comprising:
   (c1) identifying a contiguous servo data region within which the latitudinal reference point is positioned; and
   (c2) shifting the latitudinal reference point by writing an adjustment value corresponding therewith within the identified servo data region.

10. The method of claim 1 in which at least one of the many values derived in the deriving step (b) is calculated as a sum of a plurality of component distances each derived as an offset between a corresponding pair of latitudinal reference points on the data surface.

11. The method of claim 1 in which the receiving step (a) is iterated once for each of the many values derived in the deriving step (b), each iteration of step (a) performed while maintaining the transducer head in a lateral position straddling at least two of the latitudinal reference points.

12. The method of claim 1 in which the shifting step (c) is performed so as to reduce the variance by at least 1%.

13. The method of claim 1 in which the shifting step (c) is performed so as to reduce the variance by at least 5%.

14. The method of claim 1 in which the deriving step (b) includes steps of:
   (b 1) deriving an estimate for each of the average lateral offset distances between at least a few of the many pairs of successive tracks, the estimates defining a statistical distribution; and
   (b2) characterizing the statistical distribution by calculating a spread indicator.

15. The method of claim 14 in which the shifting step (c) includes a step (c1) of shifting at least some of the latitudinal reference points laterally by an amount that depends on the spread indicator.

16. The method of claim 1 in which the data storage device is a disc drive, in which the lateral offset distances of the deriving step (b) are substantially radial relative to an axis of rotation of a disc in the disc drive, and in which the longitudinal tracks are nominally circular about the axis.

17. The method of claim 1, having been improved by the method of claim 1, in which the transducer head is supported by an actuator configured to move the transducer head laterally along an arcuate path.

18. A data handling device comprising:
   a longitudinally movable data surface containing many latitudinal reference points laterally distributed across a series of many longitudinal tracks on the data surface, the many longitudinal tracks defining many successive pairs of the tracks each having an average lateral offset distance therebetween, the many average offset distances defining a statistical distribution having a variance; and
   means for reducing the variance to correct the track density of the data storage device.

19. The data handling device of claim 18 in which the variance-reducing means is many adjustment values each corresponding to one of the many reference points.

20. The data handling device of claim 19 in which each of the many adjustment values is written within a corresponding, contiguous servo data region containing the corresponding reference point.

21. The data handling device of claim 18 in which the means reduces the variance by at least 1%.

22. The data handling device of claim 18, further comprising a laterally positionable read transducer, in which, for each first one of the many reference points, a second one of the reference points exists so that the transducer can be placed in one lateral position so as to straddle both the first and second reference points.

23. The data handling device of claim 18 in which the variance-reducing means is implemented by steps of:
   (a) deriving an estimate for each of the average lateral offset distances between at least a few of the many pairs of successive tracks, the estimates defining a statistical distribution;
   (b) characterizing the statistical distribution by calculating a spread indicator; and
   (c) shifting at least some of the latitudinal reference points laterally by an amount that depends on the spread indicator.

24. The data handling device of claim 18, being a disc drive in which the lateral offset distances are substantially radial relative to an axis of rotation of a disc in the disc drive, and in which the longitudinal tracks are nominally circular about the axis.

25. The data handling device of claim 18, further comprising a transducer head supported by an actuator configured to move the transducer head laterally along an arcuate path.

* * * * *